United States Patent [19]

Nolte et al.

[11] 4,176,543

[45] Dec. 4, 1979

[54] SONIC LEAK DETECTOR AND METHOD

[75] Inventors: David G. Nolte, Houston; Winthrop K. Brown, Bellaire, both of Tex.

[73] Assignee: Texaco Inc., White Plains, N.Y.

[21] Appl. No.: 961,598

[22] Filed: Nov. 17, 1978

[51] Int. Cl.² .............................................. G01M 3/24
[52] U.S. Cl. ................................................ 73/40.5 A
[58] Field of Search ............................ 73/40.5 A, 592

[56] References Cited

U.S. PATENT DOCUMENTS

| | | | |
|---|---|---|---|
| 3,028,450 | 4/1962 | Manning ....................... | 73/40.5 A X |
| 3,462,240 | 8/1969 | Bosselaar et al. ................ | 73/40.5 A |
| 3,838,593 | 10/1974 | Thompson ........................ | 73/40.5 A |

OTHER PUBLICATIONS

Sabo, J. R., Detect Buried Steam Leaks With Acoustics, in Elec. World 186(1), p. 40, Jul. 1, 1976.

*Primary Examiner*—Charles A. Ruehl
*Assistant Examiner*—Joseph W. Roskos
*Attorney, Agent, or Firm*—Robert A. Kulason; Carl G. Ries; Henry C. Dearborn

[57] ABSTRACT

Sonic type leak detector system for liquid storage tanks or the like. It uses a hydrophone to convert sonic waves in the liquid to electrical signals. The electrical signals are divided by two band pass filters. The division is into one band which contains any leak signals, and another band which contains only noise signals. Then both bands are blanked whenever the noise signal amplitude exceeds a predetermined amount. There is a differential amplifier that acts on the outputs of both band pass filters to amplify the difference after averaging of each, whenever signals are not blanked. And, there is an indicator to show when a leak is present. The indicator is actuated whenever the output of the differential amplifier exceeds a predetermined amplitude.

9 Claims, 5 Drawing Figures

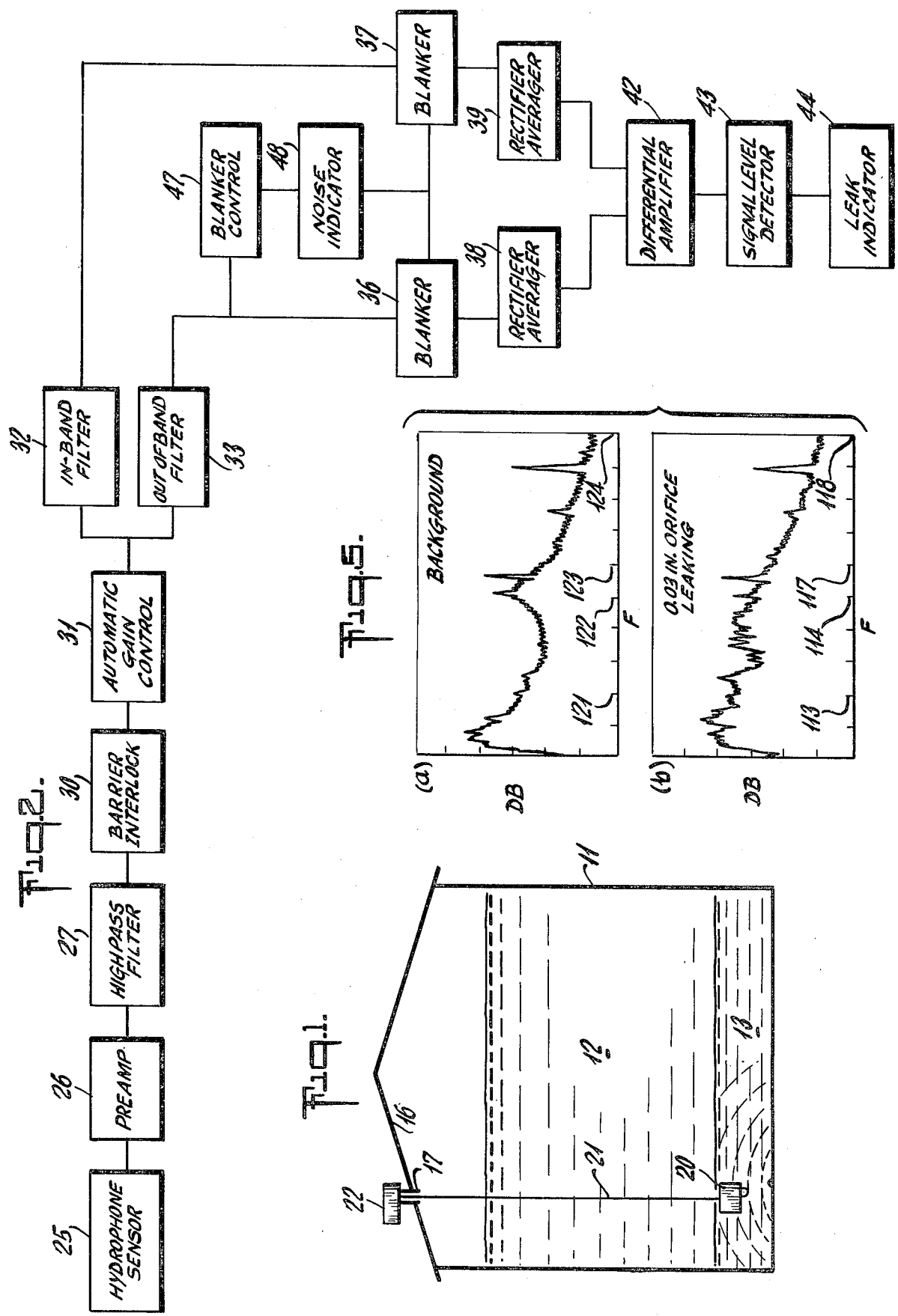

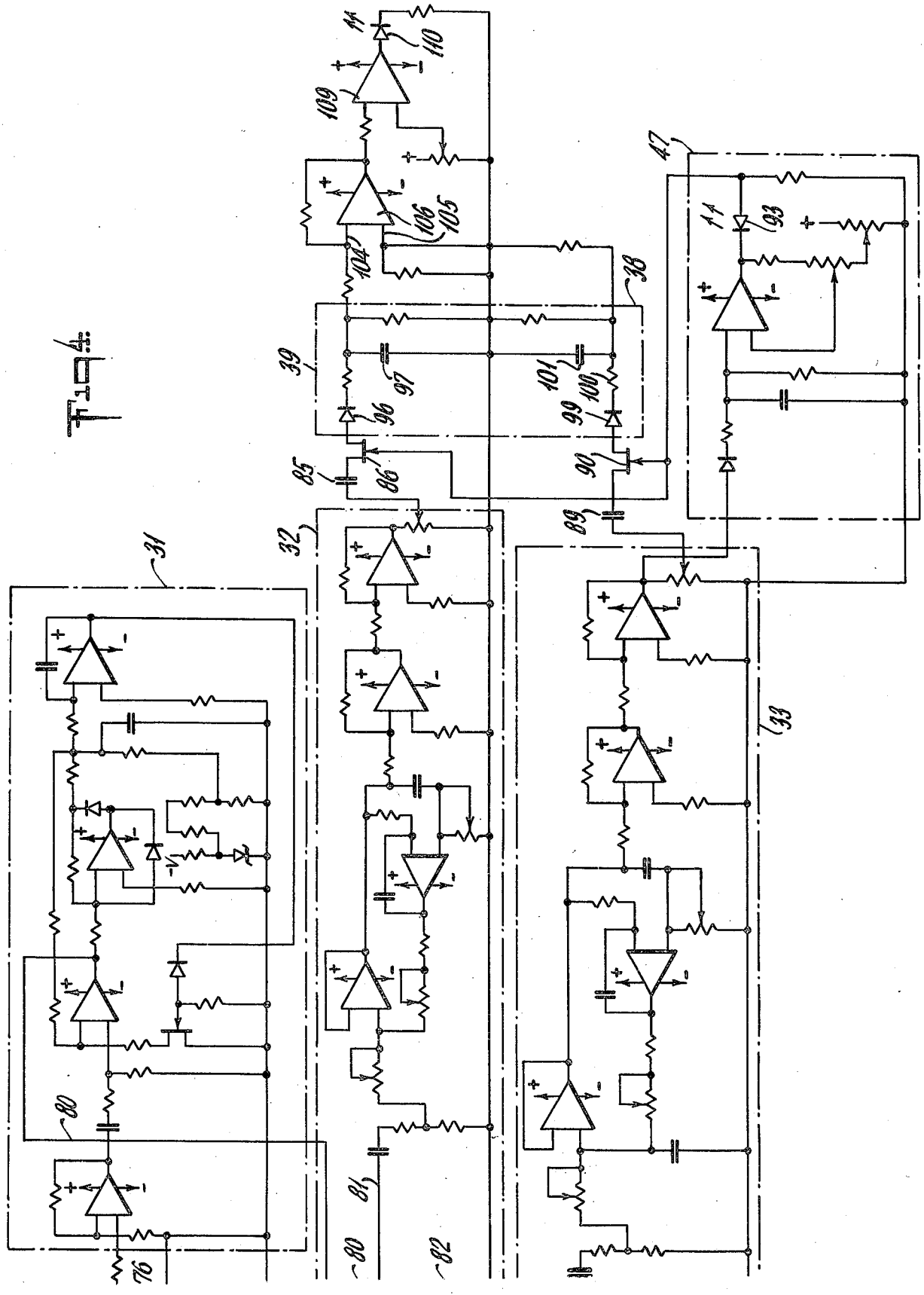

SONIC LEAK DETECTOR AND METHOD

BACKGROUND OF THE INVENTION

1. Field of the Invention

This invention concerns a leak detector, in general. More specifically, it relates to a method and apparatus for detecting leaks in a body of liquid contained by a storage tank or the like. It makes use of detection of sound waves as generated by a leak, and it deals with a system for detecting such leak generated sound in spite of general background noise tending to mask same.

2. Description of the Prior Art

Heretofore, a noise reduction technique has been proposed in U.S. Pat. No. 3,432,765, to Gottfried, issued Mar. 11, 1969. However, that patent deals with the utilization of wide band noise in two signal-free channels equally spaced from and on opposite sides of a center channel containing a desired periodic signal to cancel the noise in the center channel. That technique includes a heterodyning of the two noise channel signals to the frequency of the center channel, and includes automatic phasing with each other and with the center channel noise. Furthermore, there is no suggestion that the technique of the Gottfried patent could be applied to sonic frequencies per se.

Consequently, it is an object of this invention to provide a system for sonic leak detection, in connection with liquid storage tanks or the like.

Another object of the invention is to provide for a sonic leak detector that is particularly applicable to liquid storage tanks or the like. It employs a technique for eliminating background noises in order to detect the sonic signals emitted by a leak.

SUMMARY OF THE INVENTION

Briefly, the invention concerns a sonic leak detector for use in a liquid storage tank or the like. It comprises a hydrophone for generating electrical signals in accordance with sonic waves in said liquid, and circuit means for amplifying and filtering said electrical signals to pass signals above a predetermined minimum which is below the frequency range of the generated sonic waves. It also comprises a pair of band pass filters connected to the output of said circuit means. One of said band pass filters passes a predetermined band of sonic frequencies covering the range of said leak generated sonic waves. The other of said band pass filters passes a different predetermined band of sonic frequencies outside of said leak generated range of frequencies. And, the invention comprises electronic means for blanking output signals from both of said band pass filters upon receipt of an impulse noise signal passed by said other band pass filter. Said impulse noise signal having more than a predetermined amplitude. It also comprises a differential amplifier having inputs connected to said band pass filters and having an output. And, it comprises a leak indicator means connected to said output of said differential amplifier for indicating the existence of a leak when said differential amplifier output signal level exceeds a predetermined amount.

Again briefly, the invention concerns a sonic leak detector for use in a liquid storage tank or the like. It comprises in combination a sonic transducer means for detecting sonic waves in a liquid and generating electrical signals in accordance therewith, including both leak generated waves and background noise. It also comprises first circuit means for dividing said electrical signals. Said first circuit means comprises first and second band pass filters. The said first filter is for passing a first band of frequencies containing said leak generated signals and said background noise. The second filter is for passing a second band of frequencies containing only said background noise. It also comprises second circuit means connected to said first circuit means at the output of said second filter. The second circuit means comprises a pair of gates connected to the outputs of both said filters, and trigger means for actuating said gates to blank the outputs of both said filters whenever said background noise exceeds said predetermined amplitude. It also comprises third circuit means comprising a differential amplifier connected to the outputs of said pair of gates for taking the difference in average amplitudes of signals from said first and second band pass filters (when not blanked) in order to indicate the presence of a leak when said difference exceeds a predetermined amplitude.

Once more briefly, the invention concerns a method of detecting a leak in a storage tank or the like containing a liquid. It comprises the steps of immersing an omnidirectional hydrophone in said liquid for generating sonic frequency output signals upon receipt of sonic wave energy, and filtering said sonic frequency signals to separate first and second bands thereof from a predetermined range of said sonic frequency signals. One of said bands contains leak generated frequency signals, and the other of said bands contains only background noise frequency signals. It also comprises the step of blanking output signals from both said first and second bands upon receipt of an impulse signal exceeding a predetermined amplitude, and taking the difference in the average amplitudes of output signals from said first and second bands in order to determine the presence of a leak when said difference exceeds a predetermined amount.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic, showing a liquid storage tank with the elements of a leak detector according to the invention, mounted thereon;

FIG. 2 is a block diagram, indicating the various elements of an electrical circuit according to the invention;

FIG. 3 is a more detailed circuit diagram of the elements of the first four blocks of the FIG. 2 diagram;

FIG. 4 is a more detailed circuit diagram of the elements of the remaining units in the FIG. 2 block diagram.

DESCRIPTION OF THE PREFERRED EMBODIMENTS

Figure 5:
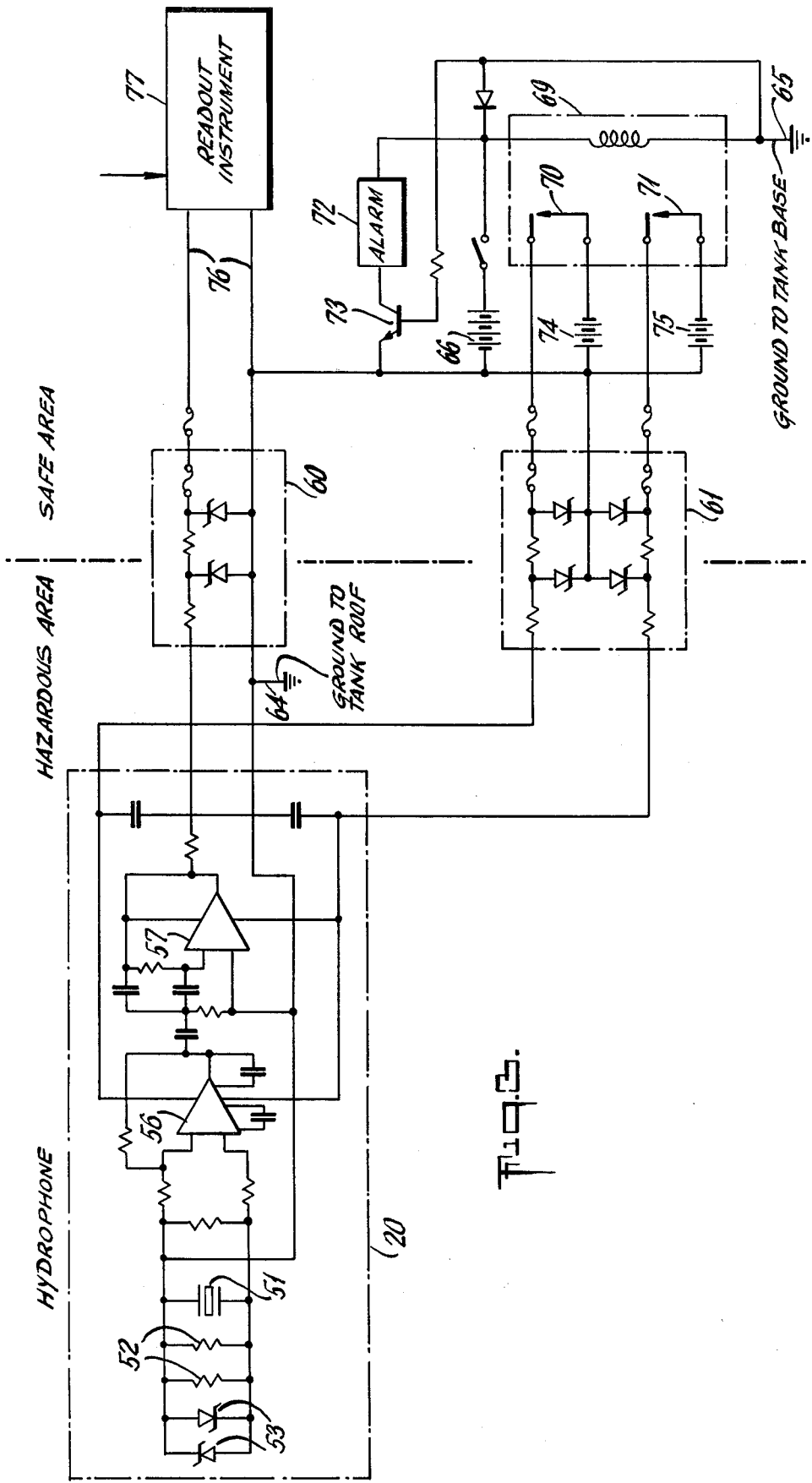
FIG. 5 shows two graphs for comparison, which indicate signal levels against frequency of the background noise alone, and the background noise plus leak signal included therein.

A need exists for speedy detection of leaks in large storage tanks, particularly where petroleum products are thus stored, because the need to avoid contamination or pollution of surroundings is of major concern.

Former methods generally required monitoring of the head or surface levels, to indicate presence of a leak. But, unfortunately, those parameters are adversely affected by slight ambient temperature and barometric pressure variations.

While sonic methods have been employed in detecting leaks in high pressure vessels, including pipe lines and the like, this has involved the fact that under such conditions a leak will emit ultrasonic acoustic signals. Therefore, such signals could be detected in spite of background noises since the latter are almost entirely in the audible frequency range. However, since a typical storage tank has a head of only 40 or 50 feet, the low pressures thus involved are not sufficient to generate ultrasonic signals. Rather, tests have shown that signals from leaks in storage tanks are ordinarily in the frequency band between 5 to 10 kilohertz.

Such signals are relatively weak because they are dispersed in a large volume of the storage tank, and because the probabilities are high that any detection instrument will be located a long distance from the leak site. Consequently, the signals created decay to a point where they become buried in broad band background noise, and detection of such signals is difficult or impossible using conventional filters. But, a system and/or method according to this invention enables the reduction of background noise interference to a sufficient extent that the leak signals may be readily detected.

FIG. 1 illustrates a typical arrangement of the physical elements as applied to a storage tank, in carrying out this invention. Thus, there is illustrated a storage tank 11 which holds a quantity of liquid product 12, that may be on top of a layer of water 13 at the bottom of the tank 11. The tank 11 has a roof 16 which has a gauge hatch, or roof manhole 17 therein.

A leak detection system according to this invention includes a hydrophone 20 that is immersed in the liquid within tank 11, and preferably is suspended at a depth so as to be immersed in any water bottom, such as the water layer 13 illustrated. The hydrophone 20 is suspended by a cable 21 that is supported by and extends down through the gauge hatch 17 from an instrument housing unit 22. It will be appreciated that, should the tank 11 not have a roof thereon, there would be some outrigger structure (not shown) set up at the top edge of the tank in order to support the instrument unit 22 from which the cable 21 and hydrophone 20 are suspended.

FIG. 2 is a block diagram that shows the various elements of a system according to the invention. As there indicated, there is a hydrophone sensor 25 that is subject to sonic waves which may exist in the liquid in the tank 11. This sensor 25 might take various forms and is preferably constructed so as to be omnidirectional in its sensitivity to the sonic waves. The sensing element (not shown) that generates electrical signals in accordance with the sonic waves that are being sensed, is preferably a piezoelectric crystal that may have a cylindrical configuration. Also included within the housing structure of the hydrophone 20, there is a pre-amplifier 26 and a high pass filter 27.

Because of the nature of the hazards, where many petroleum products are concerned, the invention as applied to detecting leaks in tanks containing such type of product will include a safety arrangement as part of the electrical circuit of the total system. Thus, in FIG. 2, after the high pass filter 27 (which is located in the housing of hydrophone 20) there is a so-called barrier interlock which is indicated by a block 30 in FIG. 2. The interlock is illustrated and will be described in greater detail in FIG. 3 hereafter.

Continuing with FIG. 2, and following the interlock 30, the electrical signals go to an automatic gain control 31. Thereafter they go to the inputs of a pair of filters 32 and 33 in parallel, in order to separate the signals into an in-band and an out-of-band frequency, respectively. The in-band frequency range is chosen to include the frequencies that are generated by a leak, while the out-of-band filter will pass only frequencies containing background noise without leak generated frequencies being included.

The output signals from filters 32 and 33 pass through a pair of so-called blankers 36 and 37. The signals then go through respective rectifier and averager circuits 38 and 39 with the outputs thereof going into a differential amplifier 42. There is a signal level detector 43 that will pass any signals from the differential amplifier 42 which exceed a predetermined amplitude, so as to actuate a leak indicator 44.

It will be observed also, that there is a blanker control element 47 illustrated in FIG. 2. The signals from the blanker control 47 energize an indicator 48 to show the presence of noise above a predetermined level, and the blanker control 47 also actuates the blankers 36 and 37 whenever the noise level exceeds a predetermined amplitude. It will be noted that the blanker control unit 47 has its input connected only to the out-of-band filter 33. The blankers act to eliminate impulse noises, e.g. from environmental disturbances, so that the leak detection is not adversely affected thereby.

FIG. 3 illustrates circuit details showing the elements that are included in the hydrophone 20. It also shows elements of the barrier interlock 30 which is indicated by that block of FIG. 2. The hydrophone includes a crystal 51 which has resistors 52 and diodes 53, connected thereacross. The resistors 52 act to prevent the crystal from accumulating a charge due to temperature or pressure variations, while the diodes 53 will prevent the buildup of a high potential across the crystal 51 in the event that the crystal is struck sharply.

The output signals from the crystal 51 go to the preamplifier circuit (26 in FIG. 2) that has two stages 56 and 57. The circuit elements that accompany these stages are designed to selectively amplify frequencies that are above a predetermined minimum. This range of frequencies is generally in the audible range, and a range which has been employed has extended from a low frequency of about 3 kilohertz to a high frequency of about 20 kilohertz.

The barrier interlock element 30 (indicated in FIG. 2) includes zener diode and resistor networks 60 and 61 which are indicated in FIG. 3. These act in conjection with a ground fault circuit which includes a tank roof ground connection 64 and a ground connection to the tank base 65. That ground fault circuit is energized by a battery 66 that supplies a relay 69 to maintain hydrophone power supply switches 70 and 71 closed, so long as the ground circuit is complete. Thus, a break in the ground circuit will deenergize relay 69 and open the switches 70 and 71, while at the same time it will energize an alarm 72 via a transistor 73. In other words, if the circuit including the two ground connections 64 and 65 should be broken, the relay 69 would be deenergized and the switches 70 and 71 would be opened to remove the power supply (i.e. batteries 74 and 75) to the hydrophone 20. Also, under the indicated conditions, the alarm element 72 would be energized via transistor 73 because the base electrode of transistor 73 which was at ground potential would now be biased into conducting state so as to energize the alarm 72.

Output signals from the hydrophone 20 are carried via circuit connections 76 on the other side of the network 60, to the remainder of the circuit elements for detecting a leak. Such remaining elements are generally indicated in FIG. 3 by a block 77 titled "Readout Instrument". Circuit details of these elements, and an explanation there of is provided hereafter in connection with FIG. 4.

FIG. 4 is a circuit diagram showing the elements which were described in connection with FIG. 2, following the barrier interlock 30. Thus, as indicated in FIG. 3, the output signals from the barrier interlock are carried over the circuit connections 76 to the remaining elements of the instrument that are indicated by the block 77. In FIG. 4, these circuit connections 76 go to the input side of an automatic gain control section 31, that is shown enclosed by a dashed line box. This maintains the overall signal amplitude at a predetermined voltage. The output signals are connected to each of the two filters 32 and 33 in parallel. These filters are enclosed by dashed lines in FIG. 4. The output from the automatic gain control section 31 goes over a circuit connection 80 to an input circuit connection 81 of the in-band filter 32, and also via another circuit connection 82 to the out-of-band filter 33.

The circuit constants employed in each of the filters 32 and 33 are such as to provide a band pass filter in each case having the frequencies desired. Thus, the in-band filter 32 covers the range that will include the leak generated signals, while the out-of-band filter 33 is such as to have its band pass frequencies those which do not include the frequencies of a leak generated signal.

Signals from the in-band filter 32 go via a capacitor 85 to a field effect transistor 86 which controls the blanking of signals therefrom. At the same time the output signals from the out-of-band filter 33 go via another capacitor 89 to another field effect transistor 90. These transistors 86 and 90 act to blank the passage of signals from both filters under the conditions previously indicated. That is, blanking is controlled by the blanker control 47 which is indicated by a dashed line box in FIG. 4. This blanker control takes the form of a Schmidt trigger, and in the output circuit thereof there is a light emitting diode 93 that acts as the noise indicator 48 which was indicated in FIG. 2.

So long as the blanker gates, i.e. field effect transistors 86 and 90 are conducting or in a conductive state, the signals from both of the band pass filter channels 32 and 33 may pass to the rectifier and averager circuits 39 and 38 (enclosed in dashed lines) respectively. Thus, the transistor 86 is connected on the output side to a rectifier diode 96 that has the other electrode thereof connected to an averaging network which includes a capacitor 97. Similarly, the output side of field effect transistor 90 is connected to one electrode of a diode 99 that has the other electrode connected to a resistor 100 which is part of the corresponding averaging circuit that includes a capacitor 101 which corresponds to the capacitor 97.

The outputs of the foregoing rectifier and averaging circuits are connected to each of two inputs 104 and 105 of a differential amplifier integrated circuit 106 (indicated by block 42 in FIG. 2). The output of the differential amplifier 106 goes to a signal level detector 109 that has a light emitting diode 110 in the output circuit thereof. It may be noted that signals out from the differential amplifier 106 are the result of the difference between the signals through the out of band filter 33 which carries noise alone and the in band filter 32 which carries noise plus leak signals. Consequently, the leak signals only appear at the output of the differential amplifier 106. The signal level detector 109 is employed to be sure that the differential output signals are sufficiently strong to be a reliable indication of the leak signal presence.

FIG. 5 shows two graphs (a) and (b). The upper graph (a) illustrates the amplitude of background noise signals against frequency absent any leak signals. This is compared with graph (b) which illustrates the amplitude of combined background noise signals and leak signals against frequency. As indicated by the caption, the leak signals were generated purposely for the test and the measurement was over the same frequency range. The test signals were found to generate leak noise in a broad band between 4 kilohertz and 10 kilohertz. And, since the graphs (a) and (b) have a frequency scale extending from zero to 20 kilohertz, the leak noise band on the graph (b) is between a second index scale mark 113 and a fifth scale mark 114.

In these tests the out-of-band filter covered the frequencies from 12 kilohertz to 20 kilohertz. And, on graph (b) this is the portion of the graph between an index mark 117 and the right hand edge of the graph (maximum mark) 118. In the upper graph (a) the corresponding index marks are a sixth mark 123 and an edge 124 of the graph. Also, the frequencies covered by the in-band filter are between index marks 121 and 122.

It will be readily apparent from observing these graphs that the difference, on average, between signals from the in-band frequencies (i.e. graph (a) between index marks 121 and 122) against the out-of-band frequencies (i.e. between index marks 123 and 124) is clearly less than the corresponding average difference when a leak signal exists. The latter is illustrated by graph (b) where the in-band frequencies between index marks 113 and 114 have considerably greater average amplitude than the in-band signals for background noise alone as illustrated in graph (a) between index marks 121 and 122. Consequently, the difference output signals from the differential amplifier 42 will be considerably greater in the case of a leak signal existing than in the case without such leak. It is this difference which will be detected by the signal level detector 43 and provide an indication of the leak.

Operation

The operation of a leak signal detector according to this invention, may be reviewed in connection with FIG. 2, as follows. The hydrophone sensor 25 will continuously develop electrical signals in accordance with sonic waves which impinge on the crystal sensor element. These electrical signals go to the preamplifier 26 and high pass filter 27 which latter eliminates only a lowest frequency range. Then the signals pass through the barrier interlock 30 for safety purposes. Next the signals are treated by the automatic gain control 31 to maintain the overall signal amplitude at a predetermined peak-to-peak voltage, and thereafter the signals go in parallel to each of the in-band filter 32 and the out-of-band filter 33. The in-band filter 32 is chosen to cover a range of frequencies which will include any leak signals caused by the liquid leaking from the tank. On the other hand, the out-of-band filter 33 is chosen to cover only frequencies outside of the band where leak signals will fall and consequently this includes only noise signals. Now, in order to eliminate malfunction which might be caused by loud impulse noises, such as may be created from environmental disturbances, the out-of-band filter output signals (from filter 33) go to the blanker control 47. Whenever these impulse noise signals exceed a predetermined level, the blanker control acts upon both blankers 36 and 37 to blank (or cut off) the passage of signals out from both in-band filter 32 and out-of-band filter 33 for the duration of such impulse noises. At the same time there is the above described noise indicator 48 which will show that signals are being blanked.

Whenever the signals are not being blanked, i.e. in the absence of impulse noises, the signals from the filters 32 and 33 are passed on to each of the rectifier averagers 39 and 38, respectively. The averaged signals from rectifier averagers 39 and 38 then go as two inputs to the differential amplifier 42. Since there is some difference to be expected between signals from the in-band filter 32 and out-of-band filter 33 even in the absence of a leak signal, the signal level detector 43 is employed to eliminate consideration of difference unless it exceeds a predetermined normal amount. If it does exceed such an amount, the signal level detector 43 permits a signal to pass through and actuate the leak indicaor 44.

It is to be noted that once an instrument according to this invention has been calibrated, there are no controls to adjust and the operation is completely automatic. It will be understood, of course, that the output signal indicating a leak might be recorded, if desired, so that a continuous visual observation would be unnecesary.

While particular embodiments of the invention have been described above in considerable detail in accordance with the applicable statutes, this is not to be taken as in any way limiting the invention but merely as being descriptive thereof.

We claim:

1. Sonic leak detector for use in a liquid storage tank or the like, comprising
   a hydrophone for generating electrical signals in accordance with sonic waves in said liquid,
   circuit means for amplifying and filtering said electrical signals to pass signals above a predetermined minimum frequency that is below the frequency range of leak generated sonic waves,
   a pair of band pass filters connected to the output of said circuit means,
   one of said band pass filters passing a predetermined band of sonic frequencies covering the range of said leak generated sonic waves,
   the other of said band pass filters passing a different predetermined band of sonic frequencies outside of said leak generated range of frequencies,
   electronic means for blanking output signals from both of said band pass filters upon receipt of an impulse noise signal passed by said other band pass filter and having more than a predetermined amplitude,
   a differential amplifier having inputs connected to said band pass filters and having an output, and
   leak indicator means connected to said output of said differential amplifier for indicating the existence of a leak when said differential amplifier output signal level exceeds a predetermined amount.

2. Sonic leak detector according to claim 1, also comprising
   means for averaging the output signals from said band pass filters.

3. Sonic leak detector according to claim 2, also comprising
   means for indicating when said blanking means are activated.

4. Sonic leak detector for use in a liquid storage tank or the like, comprising in combination
   a hydrophone capable of responding to a wide range of sonic frequencies and generating electrical signals corresponding thereto,
   a high pass filter connected to the output of said hydrophone for eliminating said electrical signals below a predetermined sonic frequency,
   a first band pass filter connected to the output of said high pass filter for passing a first predetermined band of sonic frequencies covering the range of said leak generated sonic frequencies,
   a second band pass filter connected to the output of said high pass filter for passing a second predetermined band of sonic frequencies covering a range outside said leak generated sonic frequencies,
   first and second transistor means connected to the outputs of said first and second band pass filters respectively for passing or blanking each of said first and second bands of sonic frequencies,
   trigger means for actuating said first and second transistor means to blank both said bands of sonic frequencies whenever the output signals from said second band pass filter exceed a predetermined amplitude,
   circuit means connected to the outputs of said transistor means for rectifying and averaging the output signals from both said first and second band pass filters,
   a differential amplifier connected to the outputs of said circuit means for amplifying the difference between said rectified and averaged signals,
   means for detecting the amplitude of output signals from said differential amplifier, and
   indicator means for indicating a leak when said detecting means passes signals greater than a predetermined amplitude.

5. Sonic leak detector for use in a liquid storage tank or the like, comprising
   sonic transducer means for detecting sonic waves in a liquid and generating electrical signals in accordance therewith including both leak generated waves and background noise,
   first circuit means for dividing said electrical signals to separate a first band of frequencies containing said leak generated signals and said background noise from a second band of frequencies containing only said background noise,
   second circuit means connected to said first circuit means at the output of said second band of frequencies for blanking both said bands of frequencies upon detection of an impulse of sonic waves having greater than a predetermined amplitude, and
   third circuit means for taking the difference in average amplitudes between said first and second bands of frequencies when not blanked in order to indicate the presence of a leak when said difference exceeds a predetermined amount.

6. Sonic leak detector according to claim 5, wherein said first circuit means comprises first and second band pass filters for passing said first and second bands of frequencies respectively, and said second circuit means comprises trigger means connected to the output of said second band pass filter for actuating a pair of gates for blanking the outputs of both said first and second band pass filters.

7. Sonic leak detector according to claim 6, wherein said third circuit means comprises a differential amplifier connected to the outputs of said first and second band pass filters on the output sides of said gates.

8. Sonic leak detector for use in a liquid storage tank or the like, comprising in combination
sonic transducer means for detecting sonic waves in a liquid and generating electrical signals in accordance therewith including both leak generated waves and background noise,
first circuit means for dividing said electrical signals comprising first and second band pass filters,
said first filter being for passing a first band of frequencies containing said leak generated signals and said background noise,
said second filter being for passing a second band of frequencies containing only said background noise,
second circuit means connected to said first circuit means at the output of said second filter, comprising
a pair of gates connected to the outputs of both said filters, and
trigger means for actuating said gates to blank the outputs of both said filters whenever said background noise exceeds a predetermined amplitude, and
third circuit means comprising a differential amplifier connected to the outputs of said pair of gates for taking the difference in average amplitudes of signals from said first and second band pass filters when not blanked in order to indicate the presence of a leak when said difference exceeds a predetermined amplitude.

9. Method of detecting a leak in a storage tank or the like containing a liquid, comprising the steps of
immersing an omnidirectional hydrophone in said liquid for generating sonic frequency output signals upon receipt of sonic wave energy,
filtering said sonic frequency signals to separate first and second bands thereof from a predetermined range of said sonic frequency signals,
one of said bands containing leak generated frequency signals,
the other of said bands containing only background noise frequency signals,
blanking output signals from both said first and second bands upon receipt of an impulse signal exceeding a predetermined amplitude, and
taking the difference in the average amplitudes of output signals from said first and second bands in order to determine the presence of a leak when said difference exceeds a predetermined amount.

* * * * *